(12) United States Patent
Oda

(10) Patent No.: US 12,307,289 B2
(45) Date of Patent: May 20, 2025

(54) DEVICE FOR MANAGING MID-WORK STOP STATE

(71) Applicant: FANUC CORPORATION, Yamanashi (JP)

(72) Inventor: Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 521 days.

(21) Appl. No.: 17/790,642

(22) PCT Filed: Feb. 8, 2021

(86) PCT No.: PCT/JP2021/004533
§ 371 (c)(1),
(2) Date: Jul. 1, 2022

(87) PCT Pub. No.: WO2021/161949
PCT Pub. Date: Aug. 19, 2021

(65) Prior Publication Data
US 2023/0064977 A1 Mar. 2, 2023

(30) Foreign Application Priority Data
Feb. 13, 2020 (JP) ................................ 2020-022076

(51) Int. Cl.
*G06F 9/48* (2006.01)
*G06F 9/30* (2018.01)

(52) U.S. Cl.
CPC ........ *G06F 9/4881* (2013.01); *G06F 9/30029* (2013.01)

(58) Field of Classification Search
None
See application file for complete search history.

(56) References Cited

U.S. PATENT DOCUMENTS 5,561,742 A * 10/1996 Terada .................. B25J 9/1669
  700/258
8,055,381 B2 * 11/2011 Tanaka ............... G11B 15/6835
  360/69

(Continued)

FOREIGN PATENT DOCUMENTS

| CN | 106808494 | 6/2017 |
| JP | 2012-160056 | 8/2012 |

(Continued)

OTHER PUBLICATIONS

International Search Report issued Apr. 6, 2021 in corresponding International Application No. PCT/JP2021/004533.

*Primary Examiner* — Van H Nguyen
(74) *Attorney, Agent, or Firm* — Wenderoth, Lind & Ponack, L.L.P.

(57) ABSTRACT

A device for managing a mid-work stop state comprising: a first setting unit that defines a mid-work stop state in a device accommodated in a computer; a first input unit that inputs a condition and/or cause and/or countermeasure of a mid-work stop state and associates the same with the stop state defined by the first setting unit; a first display unit that, if the device is in the mid-work stop state defined by the first setting unit, makes an output for displaying content recorded in a recording unit by a second setting unit; and a third setting unit that associates the mid-work stop state defined by the first setting unit with a time series and records the same in the recording unit, wherein the content recorded by the second setting unit can be newly generated and modified by an input from the first input unit.

6 Claims, 4 Drawing Sheets

(56) References Cited

U.S. PATENT DOCUMENTS

| | | | | |
|---|---|---|---|---|
| 9,505,129 B2* | 11/2016 | Yamamoto | ............. | B25J 9/1676 |
| 10,035,268 B2* | 7/2018 | Murata | ................. | G01B 11/14 |
| 10,118,295 B2* | 11/2018 | Oumi | .................... | B25J 9/1674 |
| 10,324,450 B2* | 6/2019 | Tateoka | ................ | G06V 20/52 |
| 10,562,185 B2* | 2/2020 | Naitou | .................. | B25J 13/085 |
| 11,027,429 B2* | 6/2021 | Matsumoto | ............. | F16P 3/148 |
| 11,518,051 B2* | 12/2022 | Vu | ......................... | F16P 3/142 |

FOREIGN PATENT DOCUMENTS

| | | |
|---|---|---|
| JP | 2018-165916 | 10/2018 |
| JP | 2018-176340 | 11/2018 |

* cited by examiner

ROBOT 8

INTERMITTENT STOP SETTING 1
- NAME : SUPPLY DELAY
  - CONDITION           : OUTPUT 08
  - STATE               : ON
  - ACTION(OPTIONAL)    : CONFIRMATION OF SUPPLY DEVICE

INTERMITTENT STOP SETTING 2
- NAME : GRIPPING FAILURE
  - CONDITION           : OUTPUT 07
  - STATE               : ON
  - ACTION(OPTIONAL)    : CONFIRMATION OF HAND

INTERMITTENT STOP SETTING 3
- NAME : PLACEMENT FAILURE
  - CONDITION           : OUTPUT 06
  - STATE               : ON
  - ACTION(OPTIONAL)    : CONFIRMATION OF HAND

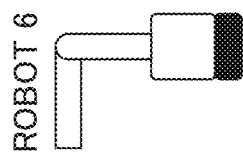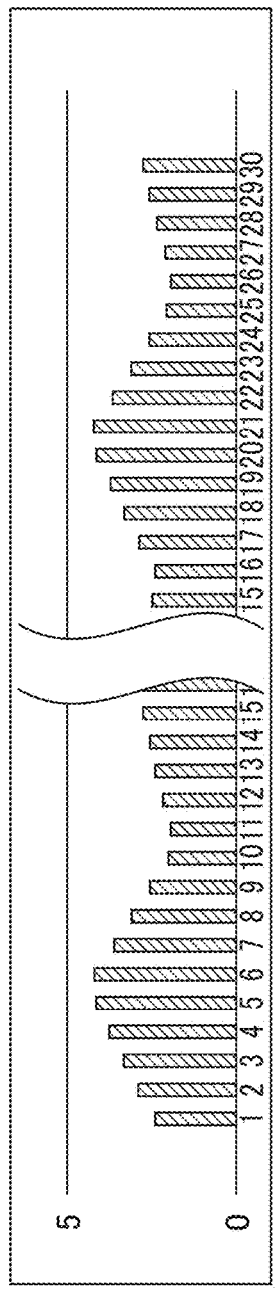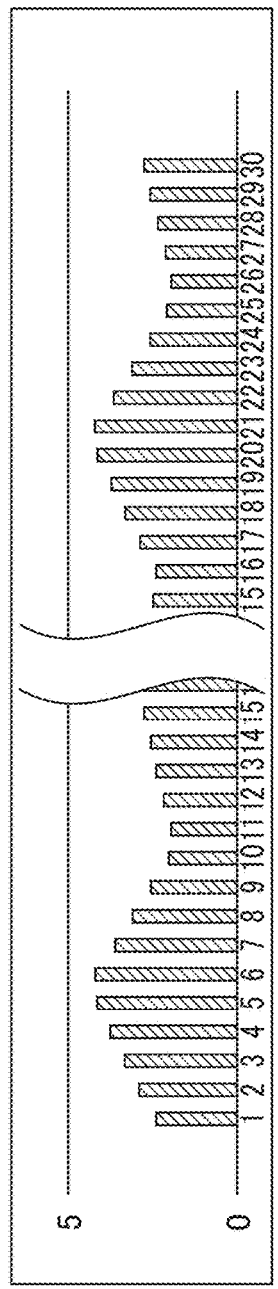
FIG. 4

DEVICE FOR MANAGING MID-WORK STOP STATE

TECHNICAL FIELD

The present invention relates to a task-in-progress stop state management device.

BACKGROUND ART

Patent Document 1 discloses that an alarm storage database 120 is a storage means for saving a history of alarm character information detected by a facility abnormality detection unit 110. Patent Document 1 also discloses that the history of alarm character information stored in the alarm storage database 120 can be downloaded from a higher rank host 100 and can be used for improving an intermittent stop, Patent Document 1: Japanese Unexamined Patent Application, Publication No. 2012-160056

DISCLOSURE OF THE INVENTION

Problems to be Solved by the Invention

A device is desirable in which a cause and a measure displayed in conjunction with a stop state of a system are contents according to actual cause and measure.

Means for Solving the Problems (1) An aspect of the present disclosure is a task-in-progress stop state management device of an automated system including one or more device, the task-in-progress stop state management device connected to the device including: a computer connected to the device; a first setting portion that proposes a task-in-progress stop state of the device stored in the computer; a first input portion that inputs a situation, and/or, a cause, and/or, a measure of the task-in-progress stop state in association with the stop state proposed by the first setting portion; a second setting portion that records contents input by the first input portion in a recording portion; a first display portion that makes an output to display the contents recorded in the recording portion by the second setting portion when the device is in the task-in-progress stop state proposed by the first setting portion; and a third setting portion that records the task-in-progress stop state proposed by the first setting portion in association with a time series, wherein the contents recorded by the second setting portion are capable of being newly created and changed by an input from the first input portion.

Effects of the Invention

According to an aspect, it is possible to set a cause and a measure displayed in conjunction with a stop state of a system to contents according to actual cause and measure.

BRIEF DESCRIPTION OF THE DRAWINGS

FIG. 4 is a diagram showing a transition of time of the stop state and a transition of the number of cases of the stop state that occurs in a predetermined period in the display unit of the task-in-progress stop state management device according to the embodiment.

PREFERRED MODE FOR CARRYING OUT THE INVENTION

Figure 1:
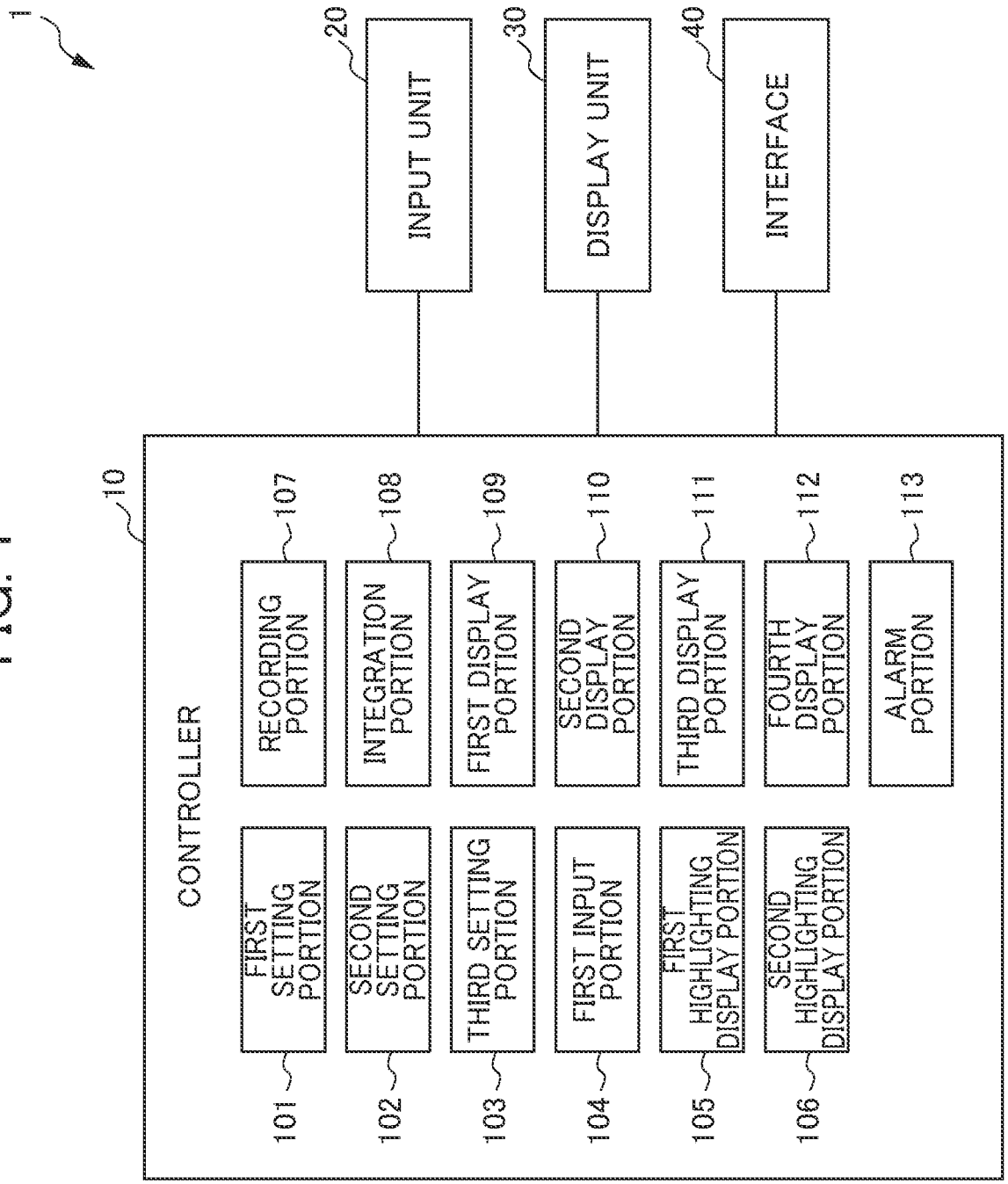
FIG. 1 is a diagram for describing a constitution of a task-in-progress stop state management device according to an embodiment.

An example of an embodiment will be described below. FIG. 1 is a diagram for describing a constitution of a task-in-progress stop state management device 1.

The task-in-progress stop state management device 1 is a device connected to each of first to eighth robots as eight devices included in an automated system. As shown in FIG. 1, the task-in-progress stop state management device 1 is constituted by installing necessary software on an electronic computer such as a computer including a CPU (processor) constituting, for example, a controller 10, and includes a computer body, an input unit 20 such as a keyboard or a mouse, a display unit 30 such as a monitor, and an interface 40 connected to an external device.

The automated system, to which the task-in-progress stop state management device 1 is connected, is arranged on a production line of an automobile, and the eight robots for performing welding are arranged four by four with a conveyor, which transfers a vehicle body of the automobile, therebetween. The task-in-progress stop state management device 1 is electrically connected to each of these eight robots, and each of the robots outputs a state (a motion state, a stop state) in each robot and posture information of each robot to the task-in-progress stop state management device 1.

The controller 10 includes a first setting portion 101, a second setting portion 102, a third setting portion 103, a first input portion 104, a first highlighting display portion 105, a second highlighting display portion 106, a recording portion 107, an integration portion 108, a first display portion 109, a second display portion 110, a third display portion 111, a fourth display portion 112, and an alarm portion 113.

Figure 3:
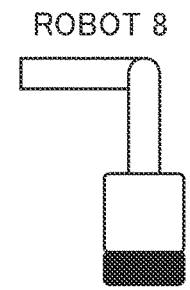
FIG. 3 is a diagram showing a display for setting contents displayed in a pop-up form by the first display portion by touching the display of "intermittent stop is occurring" displayed on robot 1 in the display unit of the task-in-progress stop state management device according to the embodiment.

The first setting portion 101 proposes and sets a task-in-progress stop state of each robot stored in the computer. Here, the "stop" means a so-called "intermittent stop", and means a state in which the robot can be recovered from a stop state by taking appropriate measures without fixing the robot and the like. Normally, the so-called "intermittent stop" is not a problem because the robot is in the stop state for a short time, but when the "intermittent stop" continues for a predetermined time or longer, measures should be taken to resolve the stop state. Therefore, this the reason why the alarm portion 113 described below displays an alarm display on the display unit 30 when the "intermittent stop" continues for a predetermined time or longer. The stop state proposed and set by the first setting portion 101 is proposed and set as a case where each of an output 08, an output 07, and an output 06 is turned ON as a condition, as shown in FIG. 3, for example.

Here, with respect to the output 08, the output 07, the output 06 and the like, a state of the robot can be recognized by detection of a servo current of each robot. Specifically, for example, it is possible to recognize by detection of a current value of a servo hand of the robot whether the robot grips the workpiece. The "output 08", the "output 07", the "output 06" and the like corresponding to the detected state in this way are configured to be turned ON based on the detected state. Instead of this ON or OFF, a quantitative signal may be used, addition may be made by a logical sum (OR) or a logical product (AND) using a combination of a plurality of state signals, or a condition of the stop state may be suggested corresponding to the "output 08", the "output 07", the "output 06" and the like.

Figure 2:
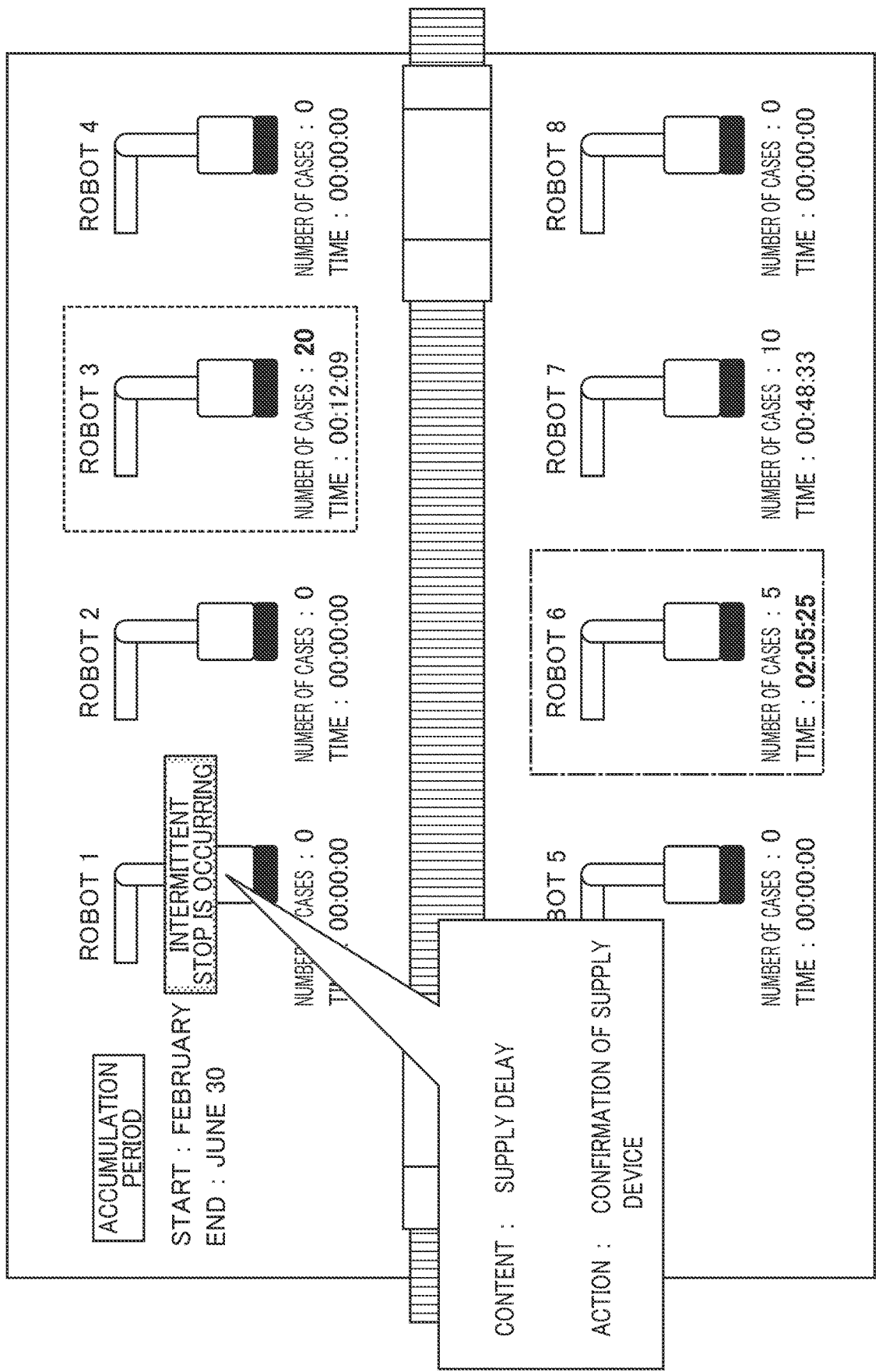
FIG. 2 is a diagram showing contents displayed in a pop-up form by a first display portion by touching a display of "intermittent stop is occurring" displayed on robot 1, the number of cases of occurrence of the stop state of each robot, a stop time and the like in a display unit of the task-in-progress stop state management device according to the embodiment.

The first input portion 104 inputs a situation, and/or a cause, and/or a measure of the task-in-progress stop state in association with the stop state proposed by the first setting portion 101. Specifically, for example, as shown in FIG. 3, when a situation is that the supply of the workpiece to the eighth robot is delayed and is a cause of the stop in the eighth robot, the input unit 20 (see FIG. 1) designates the "eighth robot (robot 8 shown in FIG. 2)", and inputs a "supply delay" to a field of a "name (situation, cause)". Then, the input unit 20 designates the "output signal 08" as a condition, and designates a state in which the output signal 08 is in an "ON" state as a state. As an action (measure), a "confirmation of a supply device" is input. Then, the input unit 20 is set to display the alarm display on the display unit when the "ON" state of the "output signal 08" continues for a predetermined time. FIG. 2 is a diagram showing contents displayed in a pop-up form by the first display portion 109 by touching a display of "intermittent stop is occurring" displayed on robot 1 in the display unit 30 of the task-in-progress stop state management device 1, the number of cases of occurrence of the stop state of each robot, a stop time and the like. FIG. 3 is a diagram showing a display for setting contents displayed in a pop-up form by the first display portion 109 by touching a display of "intermittent stop is occurring" displayed on robot 1 in the display unit 30 of the task-in-progress stop state management device 1.

Thereby, in a case where the output signal 08 is in an "ON" state when the alarm display is made, the supply of the workpiece to the eighth robot is delayed, and this causes the stop state. As described above, the second setting portion 102 records the contents, which are input in association with the first input portion 104, in the recording portion 107.

Further, the contents already input from the first input portion and recorded in the recording portion 107 by the second setting portion 102 can be changed, and contents to be newly recorded by the second setting portion can be newly created by an input from the first input portion. For example, a content of a "supply delay" described in a balloon display (pop-up display) in FIG. 2 can be changed to another content by changing the "supply delay" of "Name" displayed in FIG. 3 to another content, for example "supply delay of part A" by an input from the first input portion. In addition, when the content of the action displayed in FIG. 3 is omitted, action "confirmation of supply device" displayed in FIG. 3 is input from the first input portion, and thus the second setting portion 102 records the content of "confirmation of supply device" in the recording portion 107. At least one content of the situation, the cause, and the measure may be input from the first input portion.

The first display portion 109 makes an output to display the contents recorded in the recording portion 107 by the second setting portion 102 when each robot is in the task-in-progress stop state proposed by the first setting portion 101. Specifically, for example, on the monitor constituting the display unit 30, the "supply delay" is displayed as "Name" input by the first input portion 104 and the "confirmation of supply device" is displayed as "Action", by making an output as shown in the balloon display (pop-up display) displayed on the first robot (robot 1) in FIG. 2.

The third setting portion 103 records the task-in-progress stop state proposed by the first setting portion 101 in the recording portion 107, in association with a time series. Specifically, the third setting portion 103 records the date and time of the occurrence of the stop state each corresponding to the output signals of the "output signal 08", "output signal 07", and "output signal 06" shown in FIG. 3 and the situation, cause, and measure of such a stop state, in the recording portion 107 in a time series manner.

The first highlighting display portion 105 makes an output to highlight the robot being in the stop state as a first highlight display when each robot is in the task-in-progress stop state proposed by the first setting portion 101. Specifically, for example, when the first robot (robot 1) is in the stop state, the first highlighting display portion 105 performs the first highlight display and highlighting by making an output to display "intermittent stop is occurring" on a red background surrounded by a rectangular frame (the inside of the frame being shaded in FIG. 2) superimposed on the first robot (robot 1) on the monitor constituting the display unit 30 as shown in FIG. 2.

The second display portion 110 makes an output to display the cumulative number of cases and/or a cumulative time in a designated period for the stop state of each robot recorded by the third setting portion 103. Specifically, for example, on the monitor constituting the display unit 30 and the like, the second display portion 110 makes an output to the display unit 30 so as to display a cumulative value of the number of cases of stop from February 1 to June 30 to be "five cases" as a total value, as shown on a lower side of the sixth robot (robot 6) in FIG. 2, and so as to display a cumulative value of the stop time from February 1 to June 30 to be "02:05:25" as a total value.

The integration portion 108 calculates the cumulative number of cases and/or a cumulative time in a designated period for the stop state of each robot recorded by the third setting portion 103. Specifically, for example, as shown FIG. 2, the integration portion 108 integrates the stop time and the number of cases of stop occurrence for robot 6 from February 1 to June 30.

The second highlighting display portion 106 makes an output to highlight a robot having the maximum cumulative time and/or a robot having the maximum cumulative number of cases as a second highlight display. Specifically, for example, the second highlighting display portion 106 compares cumulative values of stop times for respective robots integrated by the integration portion 108 with each other, and makes an output to the display unit 30 so as to highlight robot 6, which is a robot having the maximum cumulative time, while surrounding by an alternated long and short dash line as shown in FIG. 2, on the monitor constituting the display unit 30 and the like as a second highlight display. Further, for example, the second highlighting display portion 106 compares cumulative values of the number of cases of stop occurrence for respective robots integrated by the integration portion 108 with each other, and makes an output to the display unit 30 so as to highlight robot 3, which is a robot having the maximum number of cases of stop occurrence, while surrounding by a broken line as shown in FIG. 2, on the monitor constituting the display unit 30 as a second highlight display. In FIG. 4, both robot 3 and robot 6 are highlighted as the second highlight display, but the second highlighting display portion 106 may make an output to the display unit 30 so as to highlight at least one. FIG. 4 is a diagram showing a transition of time of the stop state and a transition of the number of cases of stop state that occurs in a predetermined period in the display unit 30 of the task-in-progress stop state management device 1.

The third display portion 111 makes an output so as to display a transition of the cumulative number of cases and/or the cumulative time by associating the stop state of the robot recorded by the third setting portion 103 for each robot with a time series manner for a designated period. Specifically, for example, the second display portion 110 makes an output to the display unit. 30 so as to display a transition of the stop time and a transition of the number of cases of stop occurrence for robot 6 on the monitor constituting the display unit 30 and the like in a bar graph form for every day from February 1 to June 30 as shown in FIG. 4. Both the stop time and the number of cases of stop occurrence are shown in FIG. 4, but the second display portion 110 may make an output to the display unit 30 so as to display at least one.

The fourth display portion 112 makes an output so as to display the cumulative time and/or the cumulative number of cases for each robot as a total by contents of the stop state proposed by the first setting portion 101. Specifically, for example, on the monitor constituting the display unit 30 and the like, as shown in a frame of "contents of intermittent stop time" at a bottom in FIG. 4, the second display portion 110 makes an output to the display unit 30 so as to display a cumulative value of the number of cases of stop for robot 6 from February 1 to June 30 to be "02:05:25" as a total value, and so as to display a cumulative value of the stop time from February 1 to June 30 to be "02:05:25" as a total value, to display the contents as "gripping failure" to be "01:05:15", to display the contents as a "supply delay" to be "00:50:10", and to display the contents as "placement failure" to be "00:10:00". Further, on the monitor constituting the display unit 30 and the like, as shown in a frame of "contents of the number of cases of intermittent stop" at the bottom in FIG. 4, the second display portion 110 makes an output to the display unit 30 so as to display a cumulative value of the number of cases of stop for robot 6 from February 1 to June 30 to be "five cases" as a total value, to display the contents as a "supply delay" to be "three cases", to display the contents as "gripping failure" to be "one case", and to display the contents as "placement failure" to be "one case".

The alarm portion 113 makes an output to a PLC such that display unit 30 displays an alarm when the stop state of the robot during the task continues for a predetermined time, for example. Specifically, for example, when robot 1 is in a stop state as shown in FIG. 2, "output 08" corresponding to the supply delay is output. When the output 08 is continuously output for a predetermined time, the alarm portion 113 makes an output to the PLC such that the display unit 30 displays an alarm.

In the task-in-progress stop state management device 1 having the above configuration, when the task is performed by the automated system including the first to eighth robots, for example, when the stop state occurs in robot 1, the first display portion 109 makes an output to the display unit 30 so as to display "intermittent stop is occurring" on a red background surrounded by a rectangular frame superimposed on the first robot (robot 1) as shown in FIG. 2, for example, and the display unit 30 performs the first highlight display to highlight.

Then, an operator of the system taps (pats) the highlighting display "intermittent stop is occurring" on the red background surrounded by the rectangular frame in the display unit 30, and thus the balloon display (pop-up display) is displayed so as to extend from the display of the first robot (robot 1) in FIG. 2. The contents of the balloon display (pop-up display) are contents corresponding to the condition "output 08" and the like of the stop state, which has occurred in the robot stop state, that is, "supply delay" as "Name" and "confirmation of supply time" as "Action", which are recorded in the recording portion 107 together with the condition. Then, when it is desired to change the contents of the balloon display (pop-up display), the operator taps (pats) the balloon display (pop-up display) to display the display as shown in FIG. 3 on the display unit 30, for example. Here, for example, when it is desired to change the content of "Name", it is possible to rewrite and change the content of "supply delay" to another content, for example, "supply delay of part A".

Further, for example, as robot 6 shown in FIG. 2 is tapped (patted), the display is switched to the display as shown in FIG. 4, the display unit 30 displays the cumulative time and/or the cumulative number of cases for robot 6 from February 1 to June 30 as a total by contents of the stop state, and displays the transition of the cumulative number of cases and/or the cumulative time from February 1 to June 30.

The present embodiment described above has the following effects. In the present embodiment, the contents recorded by the second setting portion 102 can be newly created and changed by the input from the first input portion 104. Thus, the cause (name) and the measure (confirmation of supply device) displayed in conjunction with the system stop state can be used by being easily rewritten to contents according to actual cause and measure as necessary. In this way, since the contents of the cause, the measure and the like can be changed ox added according to the system stop state that occurs, the contents of the cause, the measure and the like can be changed or added, and accurate instructions are always given to the operator. As a result, it is possible to teach a part-time operator or an operator with little experience and the like based on accumulated knowledge about what kind of causes make the robot to be in a stop state, and about what kind of measures should be taken to which part.

In addition, the first highlighting display portion 105 makes the output to highlight the robot being in the stop state as the first highlight display when each robot is in the task-in-progress stop state proposed by the first setting portion 101. Thereby, on the display unit 30, the robot which is in the stop state can be easily recognized.

Further, the second display portion 110 makes the output to display the cumulative number of cases and/or the cumulative time in the designated period for the stop state of each robot recorded by the third setting portion 103. Thus, the display unit 30 can display the cumulative number of cases and/or the cumulative time in the designated period for stop state of each robot. Therefore, it is possible for the display unit 30 to easily recognize which robot has a large number of stop states and which robot has a stop state for a long time.

Further, the second highlighting display portion 106 makes the output to highlight the robot having the maximum cumulative time and/or the robot having the maximum cumulative number of cases, as the second highlight display. Thus, it is possible on the display unit 30 to be easily recognized which robot has the longest stop state and which robot has the largest number of stop states.

The third display portion 111 makes the output to display the transition of the cumulative number of cases and/or the transition of the cumulative time by associating the stop state of the robot recorded by the third setting portion 103 for each robot with a time series for the designated period. Thus, it is possible to record and display the transition of the stop state, the situation, and the content of the cause of occurrence of the stop state within the designated period, and it is possible to obtain a clue as to the root measure of the cause of the stop state.

Further, the fourth display portion 112 makes the output to display the cumulative time and/or the cumulative number of cases for each robot as a total by contents of the stop state proposed by the first setting portion 101. Thus, it is possible to easily recognize how much stop state of each robot has occurred from some cause within the designated period and how long the stop state is generated from some cause, and thus it is possible to collect statistics on the stop state.

The present embodiment has been described above. Although the above-described embodiment is a preferred embodiment, the present invention is not limited to the above-described embodiment, and various modifications can be made. For example, the following modifications can be implemented.

In the present embodiment, the number of robots as a device is eight, but the present invention is not limited thereto. The number of robots may be one or more. Further, the device is not limited to the robot. For example, the device may be an actuator, a transfer device, or a machine tool. In addition, the automated system has been arranged on the production line of the automobile, but the present invention is not limited thereto. In the present embodiment, the task-in-progress stop state management device 1 includes the display unit 30, but the present invention is not limited to such a configuration. For example, the task-in-progress stop state management device does not include the display unit 30, and the first display portion, the second display portion, the third display portion, the fourth display portion, the first highlighting display portion, and the second highlighting display portion and may make an output to an output device outside the task-in-progress stop state management device, and the output device can display.

EXPLANATION OF REFERENCE NUMERALS 1 task-in-progress stop state management device
10 controller
101 first setting portion
102 second setting portion
103 third setting portion
104 first input portion
105 first highlighting display portion
106 second highlighting display portion.
107 recording portion
108 integration portion
109 first display portion
110 second display portion
111 third display portion
112 fourth display portion

The invention claimed is:

1. A task-in-progress stop state management device of an automated system including one or more devices, connected to the task-in-progress stop state management device, comprising:
 a computer connected to the task-in-progress stop state management device;
 a first setting portion executed by the computer to propose a task-in-progress stop state of the one or more devices stored in the computer;
 a first input portion executed by the computer to input a situation, and/or, a cause, and/or, a measure of the task-in-progress stop state in association with the task-in-progress stop state proposed by the first setting portion;
 a second setting portion executed by the computer to record contents input by the first input portion in a recording portion;
 a first display portion executed by the computer to make an output to display the contents recorded in the recording portion by the second setting portion when the one or more devices is in the task-in-progress stop state proposed by the first setting portion;
 a third setting portion executed by the computer to record in the recording portion the task-in-progress stop state proposed by the first setting portion in association with a time series, wherein
 the contents recorded by the second setting portion are capable of being newly created and changed by an input from the first input portion,
 a first highlighting display portion executed by the computer to make an output so as to highlight the device as a first highlight display when the device is in the task-in-progress stop state proposed by the first setting portion;
 an integration portion executed by the computer to calculate a cumulative number of cases and/or a cumulative time in a designated period for the stop state of the device recorded by the third setting portion; and
 a second highlighting display portion executed by the computer to make an output so as to highlight the device in which the cumulative time is maximum and/or the device in which the cumulative number of cases is maximum, as a second highlight display.

2. The task-in-progress stop state management device according to claim 1, further comprising a second display portion executed by the computer to make an output so as to display a cumulative number of cases and/or a cumulative time in a designated period for the stop state of the device recorded by the third setting portion.

3. The task-in-progress stop state management device according to claim 1, further comprising a fourth display portion executed by the computer to make an output so as to display the cumulative time and/or the cumulative number of cases for each of the devices as a total by contents of the stop state proposed by the first setting portion.

4. The task-in-progress stop state management device according to claim 1, further comprising a third display portion executed by the computer to make an output so as to display a transition of a cumulative number of cases and/or a transition of the cumulative time by associating the stop state of the device recorded by the third setting portion for each of the devices with a time series for a designated period.

5. The task-in-progress stop state management device according to claim 1, further comprising a display unit configured to perform the display.

6. The task-in-progress stop state management device according to claim 1, wherein a condition of the task-in-progress stop state is obtained by a logical sum or a logical product using a combination of a plurality of state signals.

\* \* \* \* \*